Jan. 5, 1932.  A. S. FITZGERALD  1,840,087
CONTROL SYSTEM
Filed Jan. 31, 1930  3 Sheets-Sheet 1

Inventor:
Alan S. FitzGerald,
by Charles E. Tullar
His Attorney.

Patented Jan. 5, 1932

1,840,087

UNITED STATES PATENT OFFICE

ALAN S. FITZGERALD, OF SCHENECTADY, NEW YORK, ASSIGNOR TO GENERAL ELECTRIC COMPANY, A CORPORATION OF NEW YORK

CONTROL SYSTEM

Application filed January 31, 1930. Serial No. 425,005.

My invention relates to control systems, and more particularly to means for controlling the supply of energy to the trolley circuit of an electric railway system.

It has for its purpose to provide a method and means for automatically controlling the supply of energy to the trolley circuit in response to the physical position of a vehicle upon the track and independently of the characteristics of power currents in the trolley circuit.

A further purpose of the invention is to provide means, which are independent of the power current in the trolley circuit, for automatically connecting the energy translating substations which are located along the track, usually at the adjacent ends of adjoining sections of trolley circuit, to the high tension supply circuit, and to the adjacent sections of the trolley circuit in response to occupation of one, or both, of said sections by a vehicle.

Still another object of the invention is to provide means for accomplishing the above operation in response to carrier currents which may be supplied to the different sections of the trolley circuit.

Figure 2:
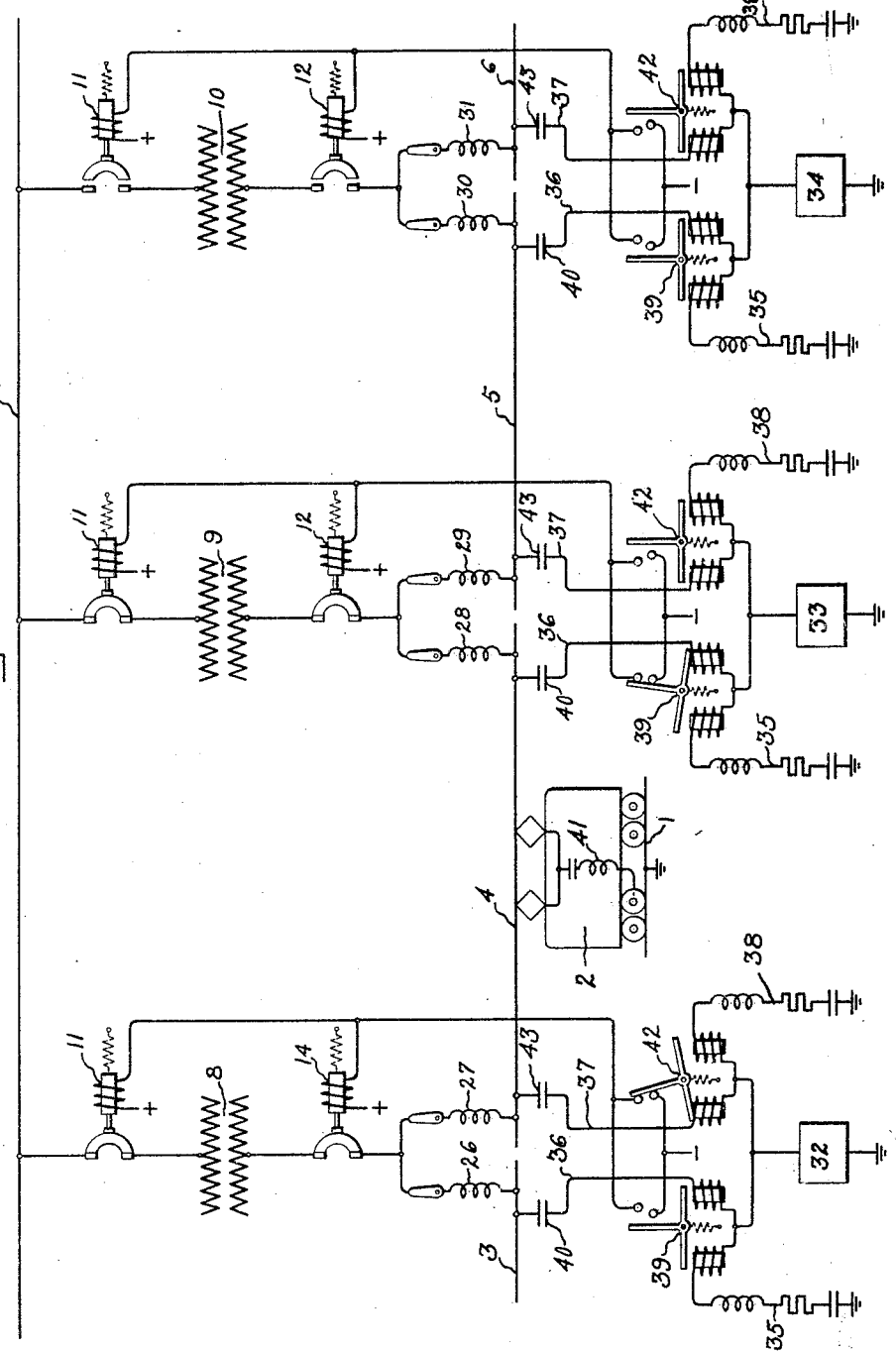
Figure 3:
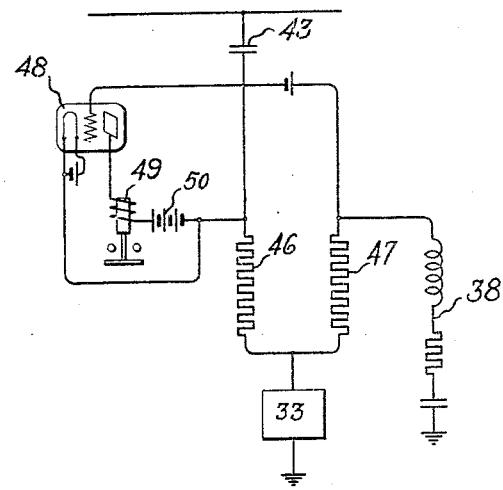
Figure 4:
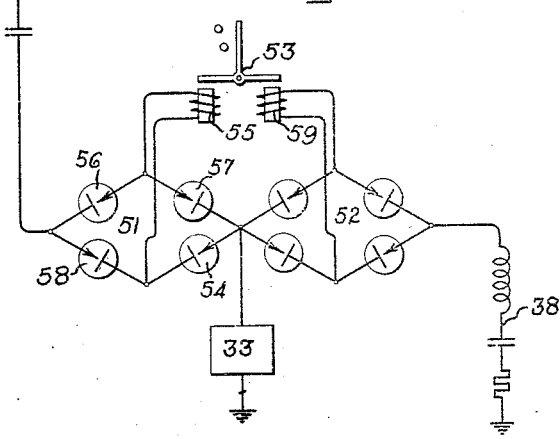

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Figs. 1 and 2 represent different embodiments of my invention and Figs. 3 and 4 represent details thereof.

Figure 1:
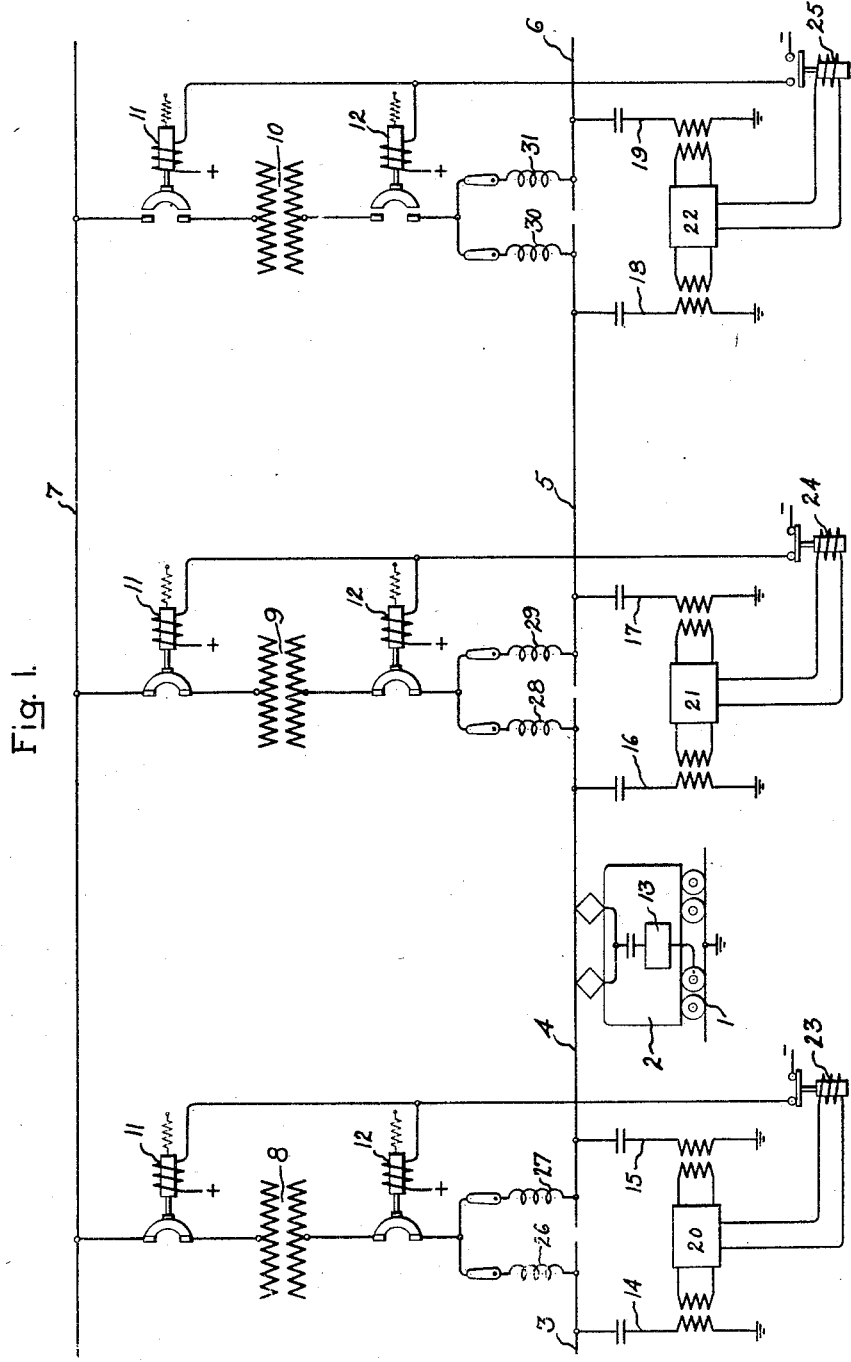

Referring to Fig. 1 of the drawings I have represented at 1 the tracks of an electric railway system and at 2 a vehicle which operates thereon. This vehicle is arranged to be supplied with energy from a trolley circuit which extends along the track and which is divided into sections 3, 4, 5, 6 in the usual manner, each of the adjoining pairs of trolley conductors being electrically insulated from each other at their adjacent ends. The trolley circuit is arranged to be supplied with energy from a high tension supply circuit 7 through energy translating substations 8, 9, 10. These substations may include any of the usual electrical apparatus but for simplicity in illustration they are conventionally represented in the drawings as transformers. A switch 11 is utilized to connect the primary of each of these transformers to the high tension supply circuit 7 and a switch 12 is utilized to connect the secondary of these transformers to adjacent ends of adjoining sections of the trolley circuit. That is, the secondary winding of transformer 8 is connected to adjacent ends of sections 3 and 4 of the trolley circuit; the secondary winding of transformer 9 is connected to adjacent ends of sections 4 and 5, and the secondary winding of transformer 10 is connected to adjacent ends of sections 5 and 6.

The switches 11 and 12 at each of the different substations are arranged to be controlled in response to carrier current which is supplied to the trolley circuit. In the embodiment of the invention shown in Fig. 1 this carrier current is supplied to the trolley circuit by means of a suitable carrier current generator 13 carried by each of the vehicles which operate upon the system. Located preferably near the ends of each section are tuned circuits 14, 15, 16, 17, 18, 19 which are connected between the trolley section and ground, each of these circuits being tuned to the frequency of current which is produced by the generator 13. Also located preferably at the adjacent ends of adjoining sections of the trolley circuit as in the substations are carrier current receivers 20, 21, 22, each of these receivers being arranged to receive carrier current from either or both of the adjoining sections through the tuned circuits. These receivers may comprise any of the usual devices which are responsive to high frequency current such as an ordinary three element electron discharge device having its grid biased negatively to a value such that normally no current flows in the anode circuit but such that when high frequency current is impressed upon the grid the current is increased in the anode circuit. Each of the receivers 20, 21, 22 has connected in its output circuit, the actuating winding of a relay 23, 24, 25. Each of these relays is arranged to be maintained normally in one position and to be actuated to the other position in response to receipt of carrier current by the receiver with which it is associated. Thus with the type of receiver described the relays 23, 24, 25 will each be normally deenergized and its contacts will be opened, whereas upon receipt of carrier current by the associated receiver the actuating winding of the relay becomes energized and its contacts close. Upon closure of the contacts of the relay a circuit is completed which extends from negative battery through the actuating windings of switches 11 and 12 of the substation at which the receiver is located to positive battery. Energization of the actuating windings of these switches causes operation thereof and energy to be supplied to the substation and to the adjoining trolley sections.

As thus arranged the operation of my device is as follows. Let us assume that the vehicle 2 is in the section 4 of the trolley circuit. Carrier current will then be supplied by the generator 13 to the section 4 and hence through tuned circuits 15 and 16 to ground, the circuit being completed through the rails and wheels of the vehicle 2. This current, which is readily separable from the power current, is prevented from flowing from section 4 to adjoining sections 3 and 5 of the trolley circuit by any suitable impedance means such as trap circuits, or choke coils 26, 27, 28 and 29, one of which is connected in each of the power supply conductors to the different sections. The receivers 20 and 21 will respond to this carrier current thereby causing operation of relays 23 and 24 and energization of the actuating windings of switches 11 and 12 at substations 8 and 9. Operation of these switches causes power to be supplied through the transformers or other translating devices located in the substation to the sections 3, 4 and 5. The receiver 22, of course, will not respond to current supplied by the generator 13 while the vehicle is in section 4 because of the choke coils 28 and 29 connected in the supply conductors at adjacent ends of sections 4 and 5 Accordingly section 6 of the control circuit will not be energized.

When vehicle 2 passes from section 4 into section 5 of the trolley circuit the receiver 21 will receive carrier current through tuned circuit 17 and accordingly switches 11 and 12 will remain in their closed position. The receiver 22 will receive carrier current through the tuned circuit 18 and accordingly switches 11 and 12 at the substation 10 will be operated to supply power to the sections 5 and 6. Accordingly section 6 will now become energized. The receiver 20 however will become deenergized due to the effect of choke coils 28 and 29 thereby causing operation of switches 11 and 12 at the substation 8 to their open position. This operation of switches 11 and 12 at station 8 causes deenergization of section 3 of the trolley circuit.

It will thus be apparent that with the vehicle in any particular section of the trolley circuit the section in which it is located and both of the adjoining sections will be supplied with power current. When it passes from one section into another in either direction it will cause a section in advance of it to become energized and a section in the rear of it to become deenergized. It will also be apparent that this operation results in response to the physical position of the vehicle along the track and independently of power current in the trolley circuit. Thus the occurrence of a fault in the trolley circuit such as would produce a low potential upon any particular section will not cause the operation of the substation equipment or the supply of power to the trolley circuit therefrom. At the same time excitation losses and the like which would otherwise occur in the substation power equipment during periods of no traffic upon the system is obviated.

The embodiment of my invention shown in Fig. 2 differs from that shown in Fig. 1 in that instead of providing each of the vehicles which operate upon the system with a carrier current generator I provide generators 32, 33, 34 located in each of the substations or at the adjacent ends of adjoining sections. The output circuit of each of these generators comprises the windings of a pair of balanced relays 39 and 42 each winding being connected in a separate circuit. One winding of each relay is connected in a circuit leading to one of the adjoining sections of the trolley conductor and the other winding of each relay is connected in a dummy circuit having adjustable impedance as will later be described. Thus, for example, the output of generator 33 comprises branches 35, 36, 37 and 38. The branch 35 includes one winding of a balanced relay 39 and a suitable combination of inductance, resistance and capacity. The branch 36 comprises the opposite winding of relay 39, the capacity 40, and section 4 of the trolley circuit. Preferably each of these circuits is tuned to the carrier frequency and the constants of the circuit 35 are adjusted in a manner such that a balance of the relay 39 is produced when no vehicle is in the section to which the branch 36 is connected whereby the armature of this relay is held out of engagement with its contacts. Similarly the branch 38 comprises one winding of a balanced relay 42 and a suitable combination of inductance, resistance and capacity. The branch 37 comprises the opposite winding of relay 42, condenser 43 and section 5 of the trolley circuit. The constants of these circuits are likewise so adjusted that a balance of relay 42 is established whereby the armature of relay 42 is normally maintained out of engagement with either of its stationary contacts.

Since the output circuits of all of the generators 32, 33, 34 are identical no further description thereof is necessary and like reference numerals have been applied to corresponding elements of the different circuits.

Each vehicle which operates upon the system is provided with a tuned circuit or a circuit 41, which offers a low or zero impedance to current of the carrier frequency, connected between the pantograph of the vehicle and the axle. If the circuit be a tuned one it will be adjusted to resonate at the frequency of the carrier produced by generators 32, 33, 34.

Thus when vehicle 2 is located in any particular section, as, for example, in the section 4, a variation in the impedance of the branches of the output circuit of the generators which include the trolley section, will be produced as a result of which a greater proportion of the output current from generator 32 will flow in the branch 37 of the output circuit from that generator and likewise a greater proportion of the output current from generator 33 will flow in branch 36 of the output circuit of that generator. Accordingly the balance of relay 42 at station 8 and relay 39 at station 9 will be disturbed and these relays will close their contacts thereby operating switches 11 and 12 at these stations to their closed position thereby to supply power to sections 3, 4 and 5 of the trolley circuit.

When vehicle 2 passes from section 4 into section 5 the carrier circuit through the vehicle will be removed from section 4 and the balance of relay 42 at station 8 and that of relay 39 at station 9 will be restored, and the balance of relay 42 at station 9 and relay 39 at station 10 will be disturbed. The restoration of the balance of relay 42 at station 8 will cause switches 11 and 12 to open their contacts and thereby deenergize this station and section 3 of the trolley conductor. Restoring of the balance in relay 39 at station 9 will not, as yet, effect deenergization of section 4 since switches 11 and 12 will be maintained in their closed position by the armature of relay 42 at that station which armature has now been actuated to close its contacts. Thus power will continue to be supplied from station 9 to sections 4 and 5. The balance of relay 39 at station 10 having been disturbed causes this relay to close its contacts, thereby to energize the actuating windings of switches 11 and 12 at this station. When this occurs these switches will close their contacts and cause power to be supplied to the sections 5 and 6 of the trolley circuit.

It will thus be apparent that as the train passes from section to section it will continuously cause energy to be supplied to the section in which it is located and the section immediately ahead and immediately to the rear. As it passes from one section to another it causes the section in advance to be energized and the section at the rear to be deenergized in the same manner as is done by means of the equipment shown in Fig. 1.

In the form of the invention shown in Fig. 2 where the carrier current is of substantially higher frequency than that of the power current relays 39 and 42 must be of sensitive construction. As such, these relays may if desired, take the form shown in Figs. 3 and 4. In the form of device shown in Fig. 3 the output circuit of the carrier current of the generator which, for example, may be generator 33 of Fig. 2 is divided into branch circuits, one of which includes an impedance 46, coupling condenser 43, and a section of the trolley conductor and the other of which includes an impedance 47 and a dummy circuit 38. Connected between suitable points upon the impedances 46 and 47, as at the end thereof opposite to the ends which are connected to the output of the generator 33, is an electron discharge device of ordinary construction having a grid which is connected to the resistance 47 and a filament which is connected to the resistance 46, and having a relay connected in the circuit which extends from the anode thereof through a source of potential 49 to the filament.

Normally the impedances of the branch circuits and that of resistances 46 and 47 are such that the carrier potential which is impressed upon the grid of discharge device 48 is not sufficient to cause operation of relay 49. When the ratio between the currents in the branch circuits is disturbed, however, as by the entry of a vehicle into the section to which the branch 46 is connected, a greater carrier potential will be supplied to the grid of the discharge device 48 such as to cause operation of the relay 49. Contacts of relay 49 will be connected in the circuit in the same manner as those of relay 42 in Fig. 2.

Another form of device which may be employed is shown in Fig. 4 in which carrier current generator 33 is shown as having its output divided in two paths, one of which comprises a bridge arrangement 51 and a section of the trolley conductor and the other of which comprises a bridge arrangement 52 and a dummy circuit 38. The bridge arrangements 51 and 52 include in each of the four arms thereof a rectifying or asymmetrically conducting device 54, 56, 57, 58. Each of these devices may comprise an ordinary electron discharge rectifier comprising a vessel including dissimilar electrodes separated from each other and surrounded by an attenuated gaseous medium such as neon or argon. These devices may also comprise rectifiers of the type shown in Patent No. 1,640,335 of Lars O. Grondahl issued August 13, 1925, or that described in Patent No. 909,877 to Thomas A. Edison. Connected across the terminals of the bridge opposite those terminals across which potential is supplied are the windings of a balanced relay 53.

During the one-half cycle of the carrier wave produced by the generator 33 current in the bridge 51 will flow through asymmetrically conducting devices 54, winding 55 of the relay 53 and asymmetrically conducting device 56 to the trolley section. During the alternate half cycle current will flow through unilateral conducting device 57, winding 55 of relay 53, and asymmetrically conducting device 58 to the trolley section. Thus during both half cycles current flows through the winding 55 of the relay 53 in the same direction, and this relay is therefore energized with direct current.

In the same way circuits may be traced through the bridge 52, and it will be apparent that the winding 59 of relay 53 will be energized with direct current. The impedance of the dummy circuit 38 is so adjusted that a balance is produced between the windings 55 and 59 and the armature of the relay 53 will be normally in the position shown in the drawing. When this balance is disturbed, as by a vehicle entering any section, this armature will be actuated to the circuit closing position thereby operating the switches shown in Fig. 2.

It may be desirable in the operation of the system shown either in Figs. 1 or 2, to introduce a time delay between the operation of the contacts of the control relays such as relays 23, 24 and 25 of Fig. 1 or 39 and 42 of Fig. 2, and the operation of the switches 11 and 12. This of course may be accomplished in any convenient manner as by inserting time delay relays (not shown) in the circuit between these devices.

While in Figs. 3 and 4 a particular type of relay may be employed, it will of course be apparent that many types of balanced devices are available for the purpose. If desired these devices may be of the thermostatic type whereby the above mentioned time delay may be effected in the relay itself.

It will of course be understood that in the practice of the invention in the form shown in Fig. 2 the relays may normally be in an unbalanced condition, the balance thereof being effected only when a train is present in the section with which the relay is associated.

Likewise it may occur that due to tuning effects of the trolley conductor the presence of the vehicle at a particular point may diminish the current flowing from the track generators to the trolley section. If in a particular section it is found that this condition occurs back contacts may also be provided upon the relays 39 and 42 associated with the particular section, whereby the control operation may be effected. The switches 11 and 12 will then be made sufficiently slow to respond to prevent their actuation as a vehicle passes such a point at any speed usually obtaining at that point. Similarly it will be understood that the generators 32, 33, 34 may be replaced by a single centrally located generator having an output circuit which extends along the track to the different branched circuits. These and other modifications are, of course, fully contemplated by the present invention.

While I have shown particular embodiments of my invention it will, of course, be understood that I do not wish to be limited thereto since many modifications, both in the circuit arrangement and in the instrumentalities employed may be made without departing from the spirit and scope of my invention as set forth in the appended claims.

What I claim as new and desire to secure by Letters Patent of the United States is:

1. In a railway system having a trolley circuit divided into sections along the track, means for supplying power current to each section at both ends thereof, and means responsive to the presence of a vehicle in any section and independent of the characteristics of the power current in the trolley circuit for causing said means to supply power to the section in which the vehicle is located and to each of the adjacent sections.

2. In a railway system having a trolley circuit divided into sections along the track, means for supplying power current to each section, means responsive to the position of a vehicle upon the track and independent of the characteristics of the power current in the trolley circuit for controlling said current supply means, and connections controlled by said current supply means for maintaining the section occupied by a vehicle and each of the adjacent sections energized, and whereby a section in the rear of said vehicle becomes deenergized and a section in advance of said vehicle becomes energized as the vehicle passes from each section into another.

3. In a railway system having a trolley circuit divided into sections along the track, a power translating device located at adjacent ends of each pair of adjacent sections, a supply circuit for said translating devices and means responsive to the presence of a vehicle in any section and independent of the character of current in the trolley circuit for connecting said translating device at each end of the section in which the vehicle is located to the supply circuit and to said adjacent sections, whereby said translating devices and respective sections are energized while said vehicle is in any section.

4. In a railway system having a trolley circuit divided into sections along the track, a transformer located at adjacent ends of adjoining sections, a supply circuit for said transformers, carrier current equipment located at adjacent ends of adjoining sections, switching means controlled by said equipment for connecting the transformer at the point where said equipment is located to said supply circuit and to both of said adjacent ends of adjoining sections, carrier current circuits including said equipment and said adjoining sections, means for preventing the flow of carrier current from one of said adjoining sections to the other, and means carried by a vehicle for altering the carrier circuits as it passes from one section to another said equipment being arranged to maintain said switching means in one position when the vehicle is in either of said adjoining sections and to operate said means to another position when the vehicle passes from either of said adjoining sections to a third section.

5. In a railway system having a trolley circuit divided into sections along the track, an energy translating device located at adjacent ends of adjoining sections, a supply circuit, means for supplying carrier current from a vehicle on said system to the section in which the vehicle is located, means for preventing the flow of carrier current from one section to another, a carrier current receiver arranged to be supplied with carrier current from either section of each pair of adjoining sections and means controlled by said receiver for connecting said translating device to the supply circuit and to adjoining sections of the trolley circuit.

6. In a railway system, a trolley circuit divided into sections along the track in accordance with considerations of practical power transmission to vehicles operating on said system, a power supply circuit, a plurality of normally deenergized energy translating devices, each of said translating devices being arranged for connection to a respective trolley section, carrier current equipment carried by a vehicle and connected in circuit with the trolley section occupied thereby, a plurality of additional carrier current equipments arranged along the track, one of said equipments being arranged in each section of the trolley circuit and in circuit with the respective trolley section, whereby a carrier current circuit is established between carrier current equipment carried by a vehicle and each of said additional equipments successively as the vehicle traverses the different sections, a plurality of switches, each switch being arranged to connect one of said translating devices to the power circuit, and means responsive to said additional carrier equipments for controlling said switches thereby to energize said translating devices and trolley sections in accordance with the position of a vehicle upon the track whereby energy losses in said translating devices during idle periods of the respective trolley sections are avoided.

In witness whereof, I have hereunto set my hand this 30th day of January, 1930.

ALAN S. FITZGERALD.